UNITED STATES PATENT OFFICE.

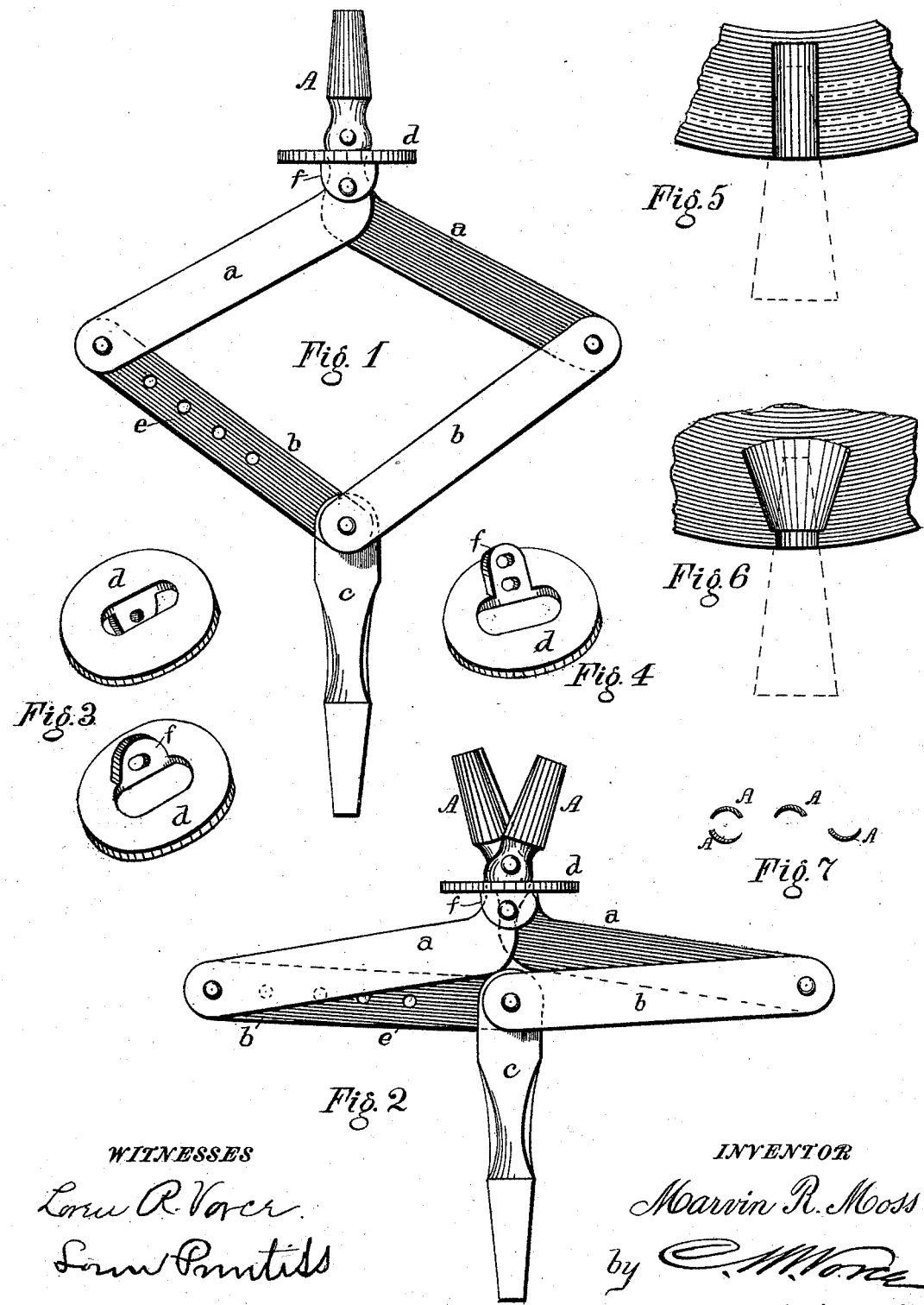

MARVIN R. MOSS, OF HUNTSBURG, OHIO.

REAMING-BIT.

SPECIFICATION forming part of Letters Patent No. 505,322, dated September 19, 1893.

Application filed October 24, 1892. Serial No. 449,821. (No model.)

*To all whom it may concern:*

Be it known that I, MARVIN R. MOSS, a citizen of the United States, residing at Huntsburg, in the county of Geauga and State of Ohio, have invented certain new and useful Improvements in Reaming-Bits; and I do hereby declare the following to be a full, clear, and exact description of the invention, such as will enable others skilled in the art to which it appertains to make and use the same.

My invention relates to bits for reaming or chambering previously bored holes, and consists in the novel construction, arrangement and combination of parts hereinafter described and pointed out in the claims.

In the drawings Figure 1 is a plan view of the bit closed; Fig. 2 a like view of the same opened; Fig. 3, a detached view of the bearing collar d, showing above the upper or outer side, and below the under side of the same. Fig. 4 represents a modified construction of the collar. Fig. 5 is a sectional view of the straight hole bored by a common bit; and Fig. 6 is a like view showing the same after being reamed or chambered by my improved bit. Fig. 7 is a transverse section through the blades of the bit, showing their clearance.

A A represent two similar curved blades formed on the ends of bars $a\ a$, which are bent to a knee shape away from the cutting edge and pivoted together at a point between the blade and the bend.

$b\ b$ are two bars each of which is pivoted at one end to the back end of one of the bars $a$, while the other end of both bars $b$ is pivoted to a stem $c$, which is squared or otherwise adapted to fit a chuck or a common brace. When the pivotal point of the bars $a$ upon each other is separated from that of the bars $b$ upon $c$, the cutting blades A A at their distal ends approach each other, and vice versa; being more widely separated the closer said pivotal points approach each other. By causing the two blades to coincide, as shown in Fig. 1, they assume a substantially tubular shape and are readily introduced into a straight hole such as is bored by an ordinary bit; upon now pressing upon the stem $c$ the blades are caused to separate and bring their cutting edges in contact with the sides of the hole, and on turning the stem $c$ by a brace or otherwise, the blades will cut away the sides of the hole laterally, separating more widely as the pressure on the stem continues, and will thus ream out or chamber the inner part of the hole without enlarging its orifice, as shown in Fig. 6. Withdrawing the stem closes the blades and enables them to be removed from the hole without marring its opening.

To enable the width of the chamber so cut to be regulated, I provide a series of holes $e\ e$ in one of the bars and fit a stop pin or set screw therein, which can be placed in any one of the holes $e$ and limits the extent to which the blades can separate. To regulate the depth of the chamber from the surface a slotted collar $d$ is placed over the bars $a\ a$ between the bend and the blade, and is pivoted to one of the bars $a$ by a pin or screw passing through a lug $f$ on the under or rearward side of the collar. The collar bears against the material in which the hole is bored, and not only regulates the depth of the chamber but prevents marring the surface. The collar may be formed with a long lug and a series of holes, as seen in Fig. 4, but is preferably made with a small lug (which can be struck down from the central slot) and a single pivot hole.

Although applicable to general purposes in reaming and chambering straight holes, for tenons, &c., this device is especially useful for recutting or "freshening" and chambering the holes bored in trees when they are tapped for making sugar. These holes are bored to fit the small end of the common taper sap-spout or "spile" which when inserted has to be driven firmly in to support the sap bucket which is hung upon it. This operation compacts the grain of the wood and obstructs the flow of the sap, only a small portion of the hole affording free outlet to the sap, as is shown in Fig. 5, in which the dotted line represents the spile driven into the hole, and even this space soon becomes obstructed by the growth or swelling of the wood, materially reducing the yield of sap. To freshen the hole by removing the spile and boring it deeper or larger is objectionable because it necessitates driving the spile too deeply, and forms permanent holes in the tree which dry out and will not grow over. By means of my above described bit, the holes can be recut and freshened by slightly enlarging their inner end without deepening the hole or enlarging its orifice, as is shown in Fig. 6, in which also the dotted line indicates the spile, and it is seen how much greater outlet for the sap is thus afforded without enlarging the orifice or driving the spile deeper.

What I claim as my invention, and desire to secure by Letters Patent, is—

1. A reaming bit having oppositely faced cutting blades pivoted together and pivotally connected at their rear ends to connecting bars pivoted to a common stem adapted to rotate the bars and blades, substantially as described.

2. The combination of the pivoted cutting blades having their oppositely bent shanks pivotally connected by connecting bars to a common stem adapted to rotate the apparatus, and a bearing collar pivotally attached to one of the blade bars, substantially as described.

3. A reaming bit consisting of two cutting blades pivoted together and having rearward extending tangs independently connected pivotally to a common stem adapted to rotate the blades, substantially as described.

In testimony whereof I hereto affix my signature in presence of two witnesses.

MARVIN R. MOSS.

Witnesses:
H. P. KILE,
A. W. STRONG.